Oct. 13, 1970    H. OSTERBERG ET AL    3,533,677
OPTICAL SYSTEMS AND METHOD FOR TRANSMITTING AND
RECEIVING OPTICAL IMAGES AND THE LIKE
Filed Feb. 24, 1969    3 Sheets-Sheet 1
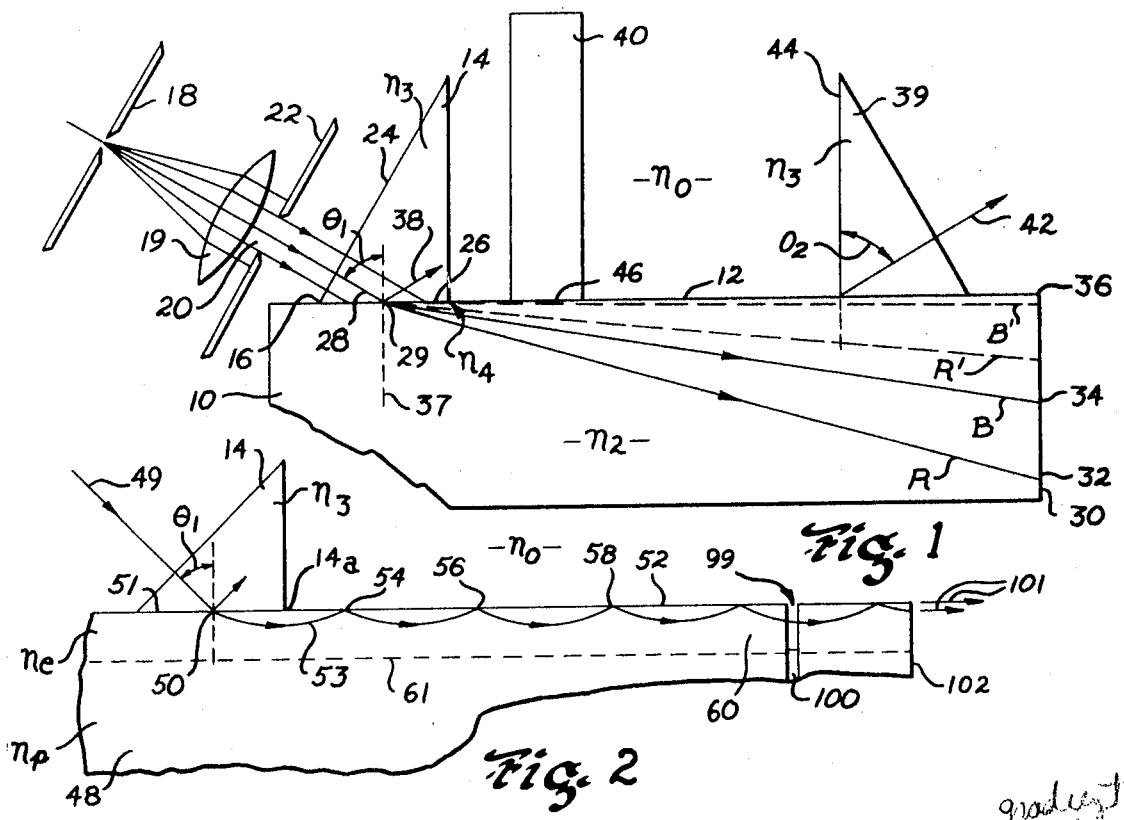
Fig. 1
Fig. 2
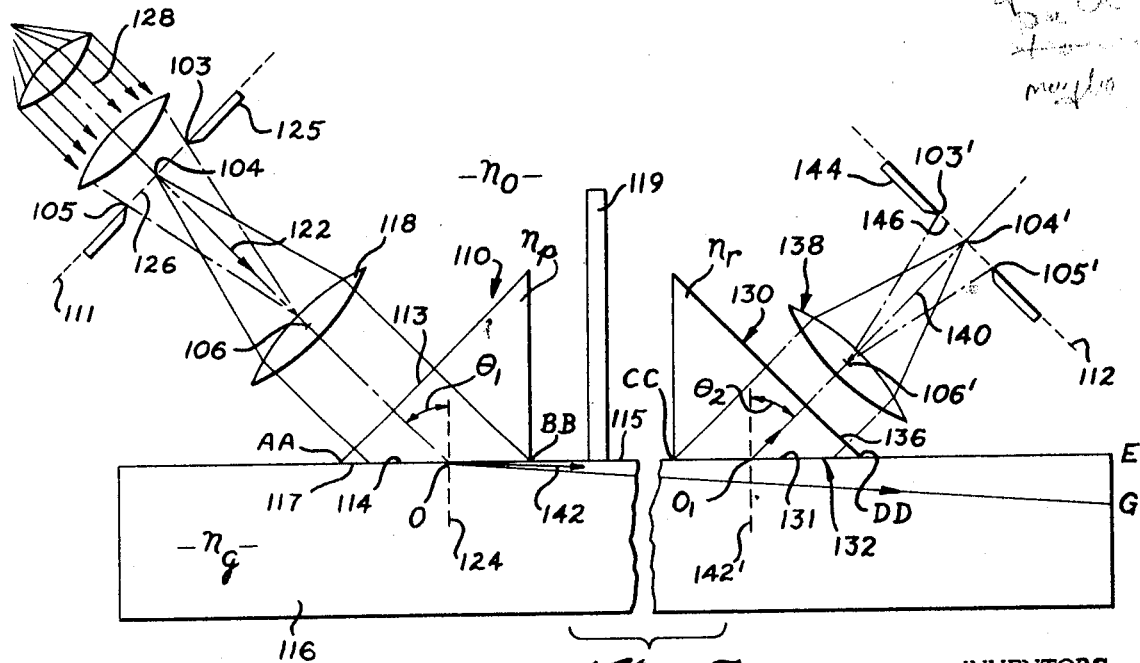
Fig. 3
INVENTORS
HAROLD OSTERBERG
LUTHER W. SMITH
JULIUS KANE
BY Noble S. Williams
ATTORNEY Oct. 13, 1970  H. OSTERBERG ET AL  3,533,677
OPTICAL SYSTEMS AND METHOD FOR TRANSMITTING AND
RECEIVING OPTICAL IMAGES AND THE LIKE
Filed Feb. 24, 1969  3 Sheets-Sheet 2

INVENTORS
HAROLD OSTERBERG
LUTHER W. SMITH
JULIUS KANE
BY Noble S. Williams
ATTORNEY

INVENTORS
HAROLD OSTERBERG
LUTHER W. SMITH
JULIUS KANE

BY
ATTORNEY

United States Patent Office 3,533,677
Patented Oct. 13, 1970

3,533,677
OPTICAL SYSTEMS AND METHOD FOR TRANSMITTING AND RECEIVING OPTICAL IMAGES AND THE LIKE
Harold Osterberg, Sturbridge, and Luther W. Smith, Brimfield, Mass., and Julius Kane, Malibu, Calif., assignors to American Optical Corporation, Southbridge, Mass., a corporation of Delaware
Continuation-in-part of application Ser. No. 352,434, Mar. 17, 1964, now Patent No. 3,489,481, which is a continuation-in-part of application Ser. No. 255,493, Feb. 1, 1963. This application Feb. 24, 1969, Ser. No. 801,517
Int. Cl. G02b 5/14, 27/00
U.S. Cl. 350—96     10 Claims

ABSTRACT OF THE DISCLOSURE

Apparatus for launching, transmitting and receiving two-dimensional optical images of good image definition by surface-guided optical wave propagation along guide surface means of special kind and for considerable distances even though such guide surfaces may twist or curve appreciably intermediate their ends and propagate across large or small open spaces in said guide surface means without appreciable attenuation in the strength thereof.

---

This application is a continuation-in-part of co-pending application Ser. No. 352,434, filed Mar. 17, 1964, now Pat. No. 3,489,481 which, in turn, was a continuation-in-part of copending application Ser. No. 255,493, filed Feb. 1, 1963, now abandoned.

This invention relates to imrovements in means for launching, transmitting and receiving optical energy and, more particularly, means for launching, transmitting and receiving two-dimensional optical images using as the medium discrete lower order modes of surface-guided optical waves which propagate along the transparent guide surface of a plate-like component, strip or the like of special kind and for considerable distances when required, and even though such plates or components may twist or turn appreciably at locations intermediate their opposite ends and even travel across large or small open spaces in said guide path without appreciable attenuation in the strength thereof.

The term "optical" as used herein is intended to include wavelengths of optical energy of all parts of the optical spectrum including not only the visible portion but the infra-red and ultra-violet portions as well.

While transparent rods and fibers have already been used to guide optical energy along a predetermined path by the principle of total internal reflection, and, in some instances, the fibers have even been made flexible so as to be able to direct the light being propagated along a non-linear path, nevertheless, such rods and fibers have had limitations as to the type of propagation and the manner in which this optical energy could be conducted. In order to conduct discrete optical modes, the diameter of such a fiber had to be restricted to a dimension comparable to the wavelength of the light to be transmitted thereby. Accordingly, the amount of energy that could be conducted by such a small fiber was materially limited.

We have found by investigation, however, that optical energy in the form of discrete lower order modes of surface-guided optical waves can be launched into and propagated along the exterior surface portion of a guide plate or component of transparent glass or the like when same is of special type provided that there exists in the plate or component adjacent the exterior guide surface thereof a gradient in the refractive index of the plate which is such that a lighter refractive index exists at the exterior surface thereof than inwardly of said surface. While the refractive index in the interior of the plate may be considered to be substantially constant, the refractive index increases in the region closely adjacent the surface as the exterior surface is approached and this is due to strain, compression, conditions of manufacture or the like such that the exterior surface and the region immediately inwardly thereof provides an inhomogeneous layer or set of layers of higher indices of refraction as locations nearer the exterior surface of the guide component are approached. Such an inhomogeneous region, nevertheless, is an integral part of the plate or component and light of the surface-guided waves while passing through such a plate appears to be progressively refracted away from the interior of the plate and back towards the exterior surface thereof as the energy travels lengthwise along the structure.

These surface-guided optical waves propagating in discrete modes of optical energy are preferred because it has been found, for example, that they are, when once launched into the plate, more difficult to disturb or destroy than are ordinary waves of light which are propagated through a homogeneous film, for example, by the phenomenon of total internal reflection. Also while scratches on the surface of a homogeneous film or guide plate or objects in contact therewith will tend to destroy or materially weaken light propagating therethrough, it has been found that even deep grooves in the exterior surface portion of the guide plate or even small or large open spaces beween parts of the guide plate have no material effect upon the propagation thereof. Also, objects such as dust or dirt, in contact with the exterior surface of such a guide plate transmitting surface-guided waves in the form of lower order modes have little or no detrimental effect thereon.

The launching of surface-guided optical waves in the form of discrete lower order modes into the plate is made possible by the use of a launching prism of higher predetermined refractive index than that of the exterior surface portion of the guide plate and of such an included prism angle that a collimated beam of optical energy directed normally into the prism through an entrance face thereof will be so refracted by the prism at the guide surface interface that this light, upon entering said plate, will be directed at near grazing incidence along said guide plate. In fact, such energy, once launched, will seem to tenaciously hug and closely follow the guide surface even though the guide surface may curve or twist appreciably in bypassing objects and the like intermediate the launching and receiving stations of said apparatus. The receiving of such surface-guided optical waves of discrete lower order mode propagation is possible by the use of a second prism of such proper higher refractive index value and included prism angle that the light will be extracted through the common interface between such prism and the guide surface and this light will be directed as parallel light outwardly substantially normally through an exit face of said prism.

Additionally, it has been found that by the use of suitable illumination means, film-supporting means and refracting collimating means sharply defined two-dimensional optical images at high image resolution may be transmitted from a first or sending location to a second or receiving location materially spaced therefrom and that it is possible even to have such optical energy propagate across open spaces or through transparent homogeneous liquids or solids on its way to the receiving station without attenuation of the optical energy and without material deterioration in the definition of the two-dimensional image being transmitted. The two-dimensional images at the receiving station are visible by the use of a telescope in optical alignment with the exit surface of the receiving prism which is so positioned and adjusted as to form an image at a final image plane of the apparatus.

It is possible, as pointed out in the first-filed application, to so angularly direct a beam of collimated light through a prism and into a substantially homogeneous or well annealed transparent plate of glass or plastic of lower refractive index in contact therewith, as to cause this light to be refracted into the plate so that a portion of this light is diffracted by the projected, narrow, effective aperture of the launching prism into grazing incidence along the prism-plate interface. Upon reaching the second prism of higher refractive index in optical contact with the plate, a second portion of this light enters said second prism and is easily observable through a telescope aligned with an exit surface of said second prism provided that said first and second prisms are only an inch or less apart. Furthermore, under such conditions, most of said second portion of the light enters said second prism at or near the forward edge thereof to produce a condition called apodization in said first-filed application wherein it is pointed out that the energy thus received is weak. It was also pointed out in said earlier application that such a propagation and apodization can be produced even when the homogeneous guide plate is simply removed and thus replaced by a homogeneous medium of air. The appearance of apodization at the entrance face of said second prism (wherein most of the energy enters near the forward edge of the second prism) is characteristic of the propagation of the light from said first prism to said second prism through a highly homogeneous plate acting as the transmitting medium and is one of the reliable indications that the light is not being propagated from said first prism to said second prism by way of actual surface guided waves.

Not only is the amount of energy transmitted from one prism to the other by such an arrangement weak, even at small distances between the prisms, but further should this small distance be increased, the amount of energy transmitted to the second prism will fall off very rapidly.

On the other hand, when a guide plate or the like having a guide surface with a sufficient gradient in refractive indices at and below its guide surface is employed in place of a homogeneous plate in such an optical energy transmitting system, it is possible to direct collimated light rays into the guide plate at very near but slightly less than critical angle of total internal reflection and cause, instead of weak apodized light, a very material increase in light flux transmitted and this flux is carried by discrete modes of surface-guided optical waves propagated through said system and appear uniformly distributed over the exit face of the receiving prism.

With respect to such a guide plate of glass or plastic for providing applicant's desired operation, it is found that the surface of the plate can conduct surface-guided optical waves of appreciable strength and in discrete lower order mode propagation only when the surface portions and regions closely adjacent thereto have higher refractive indices than inner portions of such a plate, such higher indices being caused by the surface portions of such plates being under compression or because the refractive indices at the surface and near the surface have been increased by the infusion of suitable materials.

Because these surfaces-guided optical waves of lower order modes stay close to their guiding surface while travelling from one location to another, they are very conservative as to the thickness and width of the guide strip required therefor. Thus, a suitably prepared elongated ribbon-like band or strip of transparent material of suitable optical qualities may be conveniently used as guide means between materially spaced sending and receiving locations and may even transmit across air gaps in the ribbon-like guide means as long as the guide means at opposite sides of the gap are optically aligned with each other.

These two-dimensional optical images so transmitted from a sending station to a receiving station by said surface-guided wave mode propagation are free from graininess and the like of the type commonly experienced when using fiber optical bundles for conducting two-dimensional optical images from one location to another. Also, because of the peculiar characteristics and behavior of surface-guided optical waves utilizing discrete lower order modes in their propagation, it is possible, by means to be hereinafter described, to transmit a single two-dimensional image to a plurality of different receiving locations simultaneously, and conversely possible to employ a plurality of different suitably arranged launching prisms for simultaneously sending a plurality of optical images along a single guide surface to one or to a plurality of receiving locations.

It is interesting to note that these surface-guided optical waves of discrete lower order mode propagation of the improved optical system of the persent disclosure do not behave in the usual and expected manner of conventional light waves. Nor are the optical images formed thereby of usual kind. Instead, as will be more fully explained hereinafter, the optical energy and the optical images being propagated by the structure are directly and primarily dependent upon the refractive and dispersive characteristics of the launching, guiding and receiving components of the optical system being used and this optical energy and optical images behave in new and unexpected ways.

For instance, the magnification of the transmitted image is not produced and controlled in a conventional manner. Instead, while a sharply defined optical image of an object such as a picture on photographic film disposed at a film gate of the system may be launched along the surface of the guide strip associated therewith and even projected across open air spaces or the like before being received by the associated receiving means in such a way as to reproduce the image at an image plane of the system at unit magnification, nevertheless, the insertion of a relay telescope, for example of a 2:1 magnification in the said air spaces of the system will not produce an overall 2:1 magnification in the final image. This will be more fully explained hereinafter.

In a somewhat similar manner, if a dove prism is disposed in usual fashion in the air gap or space in the system so as to intercept the projected optical beam and is then rotated in the usual manner to rotate the image, the image being provided by the optical system of the present invention will not be rotated in the usual and expected manner. Instead, when the internal reflecting face of the prism is disposed parallel to the plane of the sheet-like projected beam impinging upon the prism, the final image will be the same as when the dove prism is omitted. However, if the dove prism is positioned so as to have its reflecting surface disposed perpendicularly relative to the plane of said sheet-like projected beam, the final image will be inverted, that is, reversed side-for-side. However, rotation of this prism some 90 degrees from one of these positions to the other will not rotate the image in the usual fashion; instead, there will be a temporary blurring of the image at positions in between.

When the projected beam in the gap or free air space between parts of the surface-guiding structure is considered, it will be found that the light thereof is in the form of a sheet-like pattern of radiation which is being "end-fired" into the air gap and when later received by a second aligned surface-guiding means, it will reinduce therein surface-guided waves which, in like manner, closely and tenaciously hug the guide surface of the second surface-guiding means and may thereafter be "picked off" by a receiving prism of suitable optical characteristics positioned in optical contact with the guide means and arranged along the optical path of the system and this optical energy then used to form optical images at a final image plane of the system as already described. The "end-fired" condition referred to above may be compared in many respects to the well-known end-fired condition obtained in radio and micro-wave transmission systems and the like.

It is also possible to employ a plurality of suitably positioned launching prisms aligned, one after the other, so as to simultaneously launch different optical images along a single guide strip and such may be used to provide superimposed images at the final image plane of the system. In a somewhat similar manner, it is possible to simultaneously use a plurality of receiving prisms aligned, one after the other, in optical contact with the guide strip when desired for receiving images at a plurality of different locations. In fact, the launching prisms may be of somewhat different dispersion characteristics and this will give superimposed images of different vertical dimensions. Even the alignment of different launching prisms can be slightly different so as to provide "double images" when desired.

It is accordingly, a principal object of the present invention to provide a structure including optical components of special characteristic including a guide plate or guide component of special kind, launching and receiving prisms, film gate structure and illumination means at a first location, a collimating lens and a receiving telescope aligned with the receiving prism and a viewing screen or the like at a second or final image plane of said system, whereby two-dimensional optical images, such as pictures from photographic film, or the like, may be transmitted from one location to a second location materially spaced therefrom and without material attenuation in the optical image being transmitted for distances which may vary very appreciably.

Also, it is an object of the present invention to provide suitable launching and receiving prisms in operative relation to a surface of special character for guiding surface-guided optical waves in discrete lower modes in such a manner that a plurality of images may be launched and transmitted simultaneously along said guide surface means to a single receiving station or to a plurality of different receiving stations or, on the other hand, images from a single launching station may be transmitted along said guide surface and received at a plurality of different receiving locations as two-dimensional images.

It is also an object of the present invention to provide novel means whereby a sharply defined optical image may be transmitted by surface-guided optical waves and by use of discrete lower order mode propagation to a plurality of receiving stations and, at the same time, have the images so received of different magnifications considered in the vertical direction thereof.

Other objects and advantages of the invention will become apparent from the detailed description which follows when taken in conjunction with the accompanying drawings wherein:

FIG. 1 is a side elevational view of the structure for use in describing the principles of operation being used for launching, transmitting and receiving surface-guided optical waves in the order of discrete lower order mode propagation;

FIG. 2 is a fragmentary side elevational view of structure for use in launching and transmitting such surface-guided optical waves;

FIG. 3 is a diagrammatic side elevational view of structural and optical means for use in explaining the principles of transmitting two-dimensional optical images by the principles of the present invention;

Figure 4:
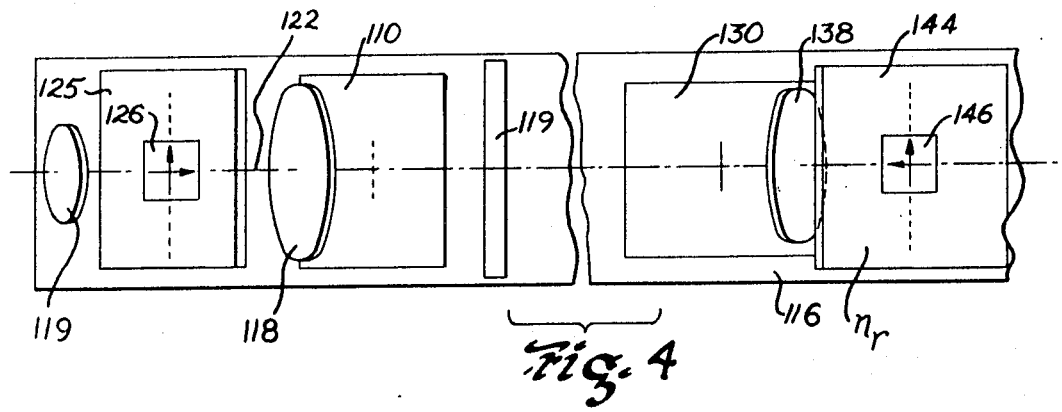
FIG. 4 is a plan view of the structure of FIG. 3.

Referring to the drawings in detail and in particular to FIG. 1, it will be seen that a suitable plate of transparent material, such as ordinary plate glass or sheet of plastic of appreciable thickness is shown at 10 and this plate has an exterior flat upper surface 12 upon which is carried a transparent optical prism element 14. As will appear presently, this element may also be termed a launching prism because of the manner in which it is to function. This glass or plastic plate 10 has a predetermined refractive index $n_2$ which is of a greater value than the index of other material generally in contact with the guide surface portion thereof. Since plate 10, as shown in FIG. 1, is being used in air, the reference character $n_0$ above the plate 10 is used to indicate the refractive index of the material in contact with the plate and in this case is equal to 1. On the other hand, the optical element 14 has a refractive index $n_3$ which is of a greater value than that of the plate 10 and, in order to get good optical contact between plate 10 and the launching element 14, there may be provided between these two members a thin layer of suitable material such as immersing oil or optical cement 16 of a predetermined refractive index $n_4$ which is of a value equal to or between that of the plate and that of the element. Preferably, it would be chosen substantially equal to the refractive index value of the element 14. An even better condition would be to have a complete optical contact between the prism and the guide plate at the interface therebetween so that no thickness of material between these two elements would be present such as might cause a double image to be transmitted by the structure in a manner to be later described.

A collimated beam of light, for example, from a narrow strip-like light source 18 and a collimating lens 19 is indicated at 20 and the size of this beam, where it impinges upon the optical element 14, is controlled by a diaphragm 22 so that the part of this beam which enters element 14 in substantially normal relation to the entrance surface 24 thereof will reach substantially all parts of the exit surface 26 as collimated light at such an angle as to be slightly less than the critical angle of total internal reflection for the transparent materials being used for the guide plate and the launching prism.

Therefore, if a ray of this collimated beam, such as ray 28 is considered, it will be found that this ray at its point of intersection 29 with the top surface 12 of the ordinary piece of plate glass 10 will have an angle of incidence which is such that a red ray R therefrom will be refracted and directed to the end wall 30 of the plate 10 at a point 32 while a blue ray B therefrom will be differently refracted and will reach the end wall 30 at a point 34. Also, it should be appreciated that a spectrum of other intermediate colors from point 29 will impinge upon the end wall 30 between points 32 and 34.

If the direction of the entering collimated light is changed so as to increase the angle of incidence of ray 28 at point 29, it is possible to so change the direction of the refracted light rays within the plate and coming therefrom as to cause the ray R to shift up to a new position indicated by the dotted line R' and ray B to move up to a new dotted line position indicated by B'. At this time, it will be found that a portion of the light of the blue region of the spectrum will be propagated along the surface 12 of the plate as diffracted light substantially at grazing incidence. By increasing the angle of incidence $\theta_1$ still more, the red ray at R' can be made to move up to the upper surface of the plate 10 at the point 36 and, at this point, the critical angle of total internal reflection for this ray will be reached. Of course, at this time, a large part of the light incident upon the surface 26 will be reflected upwardly within element 14, as suggested by arrow 38.

However, when under these operative conditions, a second prism optical element 39, like that indicated at 14, is disposed upon the upper surface 12 and in intimate optical contact therewith, as shown in FIG. 1, and an opaque block of material such as that shown at 40, is placed upon the upper surface 12 of this plate 10 between the launching optical element 14 and said second prism element 39, it will be found that light rays, such as that indicated by arrow 42, will leave the upper surface 12 of the plate 10 and enter the element 39 mostly near the forward corner thereof, travelling in the direction indicated by the arrow. Also, when a normal to these surfaces is considered and the included angle $\theta_2$ measured, it will be found to be of the same value as the angle of incidence $\theta_1$. In fact, even using a layer of black paint between the opaque block 40 and the surface 12, as indicated at 46, does not prevent the transmission of the light indicated by ray 42.

Further investigation, in an endeavor to ascertain what optical phenomenon is actually involved in such behavior of light, revealed, for example, that when a well annealed plate of very clear optical glass is used in place of the ordinary piece of plate glass 10 of FIG. 1, very poor or almost no transmission and emission of the light from the second optical prism 39 in the manner described is had. It was found from investigation that a condition which is known in the art as apodization occurs, that the energy being received is weak and is due to diffracted light caused at the effective aperture of the launching prism where it is in contact with the guide plate 10.

Figure 8:
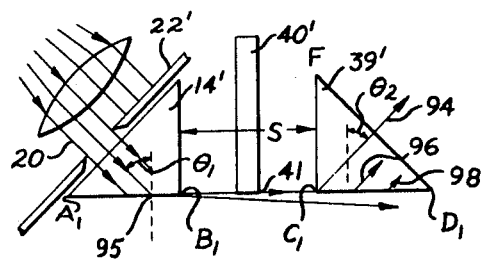
FIG. 8 is another diagrammatic sketch for use in explaining the behavior of certain light rays during investigation of the principles of the present invention.

It was further pointed out in the earlier-filed application that a propagation and apodization condition likewise can be produced when the guide plate is, in fact, removed and only air as a highly homogeneous medium used as the propagation medium between the perfectly aligned launching and receiving prisms. The following observations taken while considering FIG. 8 which shows a structure like that in FIG. 1 but with guide plate 10 omitted, will help to give an understanding of the conditions being encountered. Here, for example, two prisms 14' and 39' of the same glass composition and which, in this instance, where a spectral crown glass having a refractive index of 1.52 are aligned with each other in air as illustrated so that the refracting face $A_1B_1$ of prism 14' and faces $C_1D_1$ of prism 39' are precisely co-planar. An opaque blocking member 40' is disposed as indicated between these prisms 14' and 39' so that the only light from collimated beam 20 which can pass from prism 14' into prism 39' must be refracted out of the surface $A_1B_1$ and hence into face $C_1D_1$. This ray is indicated at 41. The right angular prism edges, indicated in the drawing by corners $B_1$ and $C_1$, are sharp edges. Also block 40' is arranged so that it just fails to intercept this ray 41 travelling along line $B_1C_1$.

It is preferred that the diaphragm 22' be closed far enough so that the light rays from a slit light source (like that a 18 in FIG. 1 and which is disposed so as to be parallel to the plane of the entrance surface of prism 14') cannot illuminate the corner $B_1$. Whereas it is commonly believed that a visible amount of light cannot pass from prism 14' into prism 39' under such conditions, it was found experimentally by looking directly into prism face $D_1F_1$ that a weak but, nevertheless, readily visible beam of light emerged from face $C_1D_1$ when angle $\theta_1$ of prism 14' was set at or very near the critical angle of total internal reflection in prism 14' and when the separation S of these prisms in air did not exceed an inch or so.

The required size of these prisms 14' and 39' is not critical. However, most of the light appears to emerge from the corner $C_1$ and also the strength of the emergent beam coming from the face $C_1D_1$ diminishes rapidly when considered from corner $C_1$ along the face $C_1D_1$ towards corner $D_1$, as indicated by the comparative lengths of the rays 94, 96 and 98. Under such conditions, we may say, accordingly, that the entrance pupil of prism 39' appears to be heavily apodized.

The energy being received by the second prism is weak and is due to diffracted light caused at the effective aperture of the launching prism. Of course, in this case, the air in between the prisms and acting as the propagation medium is highly homogeneous. Furthermore, the strength of the emergent beam from the second prism decreases rapidly when the separation S between the prisms is increased while the prisms were maintained in the co-planar condition. Consequently, since these rays from aperture $A_1B_1$ graze prism surface $C_1D_1$, they are refracted at the critical angle of prism 39' into the prism, and since prisms 14' and 39' in this case have the same refractive index, these rays emerge through prism 39' at an angle $\theta_2$ equal to $\theta_1$. The light radiated from prism 14' into prism 39' in this manner does not involve the presence of surface-guided optical waves nor exhibit any lower order mode propagation. When the prisms 14' and 39' of crown glass of a refractive index of 1.52 were replaced by like flint glass prisms having refractive indices of 1.62, a similar set of results were obtained. Additionally, when a plane polished surface of a single thick homogeneous quartz crystal, with its optic axis parallel to the direction of propagation of the refracted light from prism 14' was placed in contact with prism faces $A_1B_1$ and $C_1D_1$, by the use of an immersing oil therebetween having a refractive index within the range of 1.56 and 1.62 and light transmitted through this system results qualitatively similar to those described were obtained. The light emerging from the front corner $C_1$ of the prism was weak but like those in FIG. 8 the rays corresponding to 96 and 90 further removed from corner $C_1$ were much weaker than the corner ray corresponding to 94.

On the other hand, when a plate of transparent material of other kind known to have a high refractive index at its outer surface in comparison with the index internally of the plate and a gradient in refractive index of decreasing values inwardly from said surface was employed, it was found to give good light transmission properties in the form of surface-guided optical waves which were propagated in the form of discrete lower order modes. Plates capable of providing this improved light propagation were known to possess at their outer or exterior finished surfaces high degrees of strain so that the surface in optical contact with the prism faces $A_1B_1$ and $C_1D_1$ were under internal compression resulting from the manner in which they were manufactured or contained metal ions or the like in their surface portions of controlled amounts so that said high energy transmission in the form of surface-guided optical waves at lower order modes was obtained. It was found that sheets of methyl methacrylate of proper surface characteristics would provide good light propagation and also that plates of float-type glass, particularly that side surface of the plate which was formed by cooling in contact with molten metal, such as tin, provided excellent results. When plates having the proper surface guiding characteristics are employed, the nature of the light rays or beams being propagated from prism face $A_1B_2$ and entering the prism face $C_1D_1$, when the angle $\theta_1$ for prism 14' is adjusted to near its critical angle with respect to the index of the contacted plate has the following properties:

(1) The light beam emerging from prism face $C_1D_1$ in contact with the glass plate will be many times more powerful than the feeble beam seen in the above-mentioned structure when only a conventional well annealed piece of glass, or the like, is employed.

(2) The emerging beam from the prism 39' does not change appreciably in intensity when the spacing between the prism 14' and 39' is increased appreciably, whether this distance be several feet or many times such amount.

Also, the intensity of the emerging beam is uniform over the entire face $C_1D_1$ of the exit prism and also the uniformity of the light from the $C_1D_1$ face of the prism is the same even in cases wherein the dimensions of the receiving prism are increased considerably. While a perfect optical contact between the launching and receiving prisms and the guide plate surface is preferred, it should also be noted that extreme care must be exercised in cases wherein an immersion oil is used at the interface between the prism and the plate in order to avoid non-uniformity conditions such as might cause interference fringes or image blurring or the like which may be traceable to a wedge effect in the immersion oil in contact at the interface between prism and guide plate.

A study of all of the different conditions involved indicates that the surface-guided optical wave phenomenon in discrete lower order mode propagation is obtained due at least in a large measure to the presence of materially higher refractive indices at and near the exterior surface of the plate than in the interior thereof and that this inhomogeneity in the plate is caused by the varying degrees of compression or other physical characteristics existing in the glass or the plastic plate-forming material very near the exterior surface thereof and resulting from the cooling or other conditions encountered during the formation of the plate material. In the float-type glasses and particularly the surface thereof cooled in contact with the molten metal, which is the surface of good conductivity for surface-guided optical waves of the character being considered herein, it is possible that some diffusion or infusion of molecules or ions of metal into the surface layers of the glass have enhanced the surface wave guiding properties thereof. The resulting integral layers at and near the exterior guide surface of the plate, nevertheless, are of an inhomogeneous nature when considered in a direction normal to the exterior surface thereof.

In ordinary float types of plate glass being manufactured by cooling the molten glass upon a layer of molten metal, such as tin, inherent conditions at and near the surface of the glass which was in contact with the molten metal at the time it was formed cause a gradient in refractive index which is highest at the outer surface and which decreases in a gradient of refractive indices as layers inwardly thereof are considered. This inherent gradient provides a refractive index at the exterior surface which is higher by amounts from 0.0003 to 0.002 when considered in reference to the refractive index at the interior of the plate, considered generally.

Upon investigation, it was found that if a piece of glass having a float-formed surface exhibiting, for example, the refractive index difference mentioned above of 0.002 was ground to remove a small surface layer and then re-polished and measured for refractive index conditions at the then-exposed exterior surface, and such a procedure repeatedly followed to measure the refractive indices at the surface of the plate when various different layers had been removed, it was eventually found that a total of as much as 0.12 millimeter of glass was removed before said gradient was eliminated.

The amount of light flux transmitted before altering the surface of the plate as just described was 75 on a photocell-operated meter being used to monitor the results, and this reading was reduced to 1.5 after such repeated altering of the plate.

A reasonable and practical range for this inherent refractive index difference at the exterior surfaces of plates for good power transmission together with good image definition, free from image blurring due to too many modes being transmitted, is from 0.001 to 0.0003; and these values are well beyond any values which can be found in ordinary commercially available plate glasses.

Accordingly, it will be appreciated that the inherent conditions within the surface portion of the glass exhibit a gradient in refractive indices which progressively change and lessen as layers inwardly of the original surface are considered. Also, investigation has shown that the propagation of surface-guided optical waves of discrete lower order mode characteristics takes place in this comparatively thin surface portion of the guide plate throughout the length thereof.

Furthermore, when such an experiment as just described is used to measure the refractive index characteristics of different layers of such a float-type glass for changing refractive indices, it is apparent that the optical material at the surface and at layers near the surface transport much more light flux than would be possible in any plate of homogeneous material.

In the structure shown in FIG. 2, the launching prism 14 is disposed in optical contact with a plate 48 having an inhomogeneous layer integral therewith and of such a character as to exhibit the gradient in refractive index characteristics referred to above. When a light ray such as ray 49 was launched into such a plate at very near the critical angle of total internal reflection, it seemed to pass into the plate and then be refracted back to the exterior surface 52 thereof at point 54. The ray then "bounced" along the plate at a successive series of spaced points, such as indicated at 56 and 58, as the ray seemed to "bounce" back into the plate and gradually curve back to the surface along its path of propagation. It is reasonable to consider that, because of the gradient in the refractive index of the thin guide surface portion 60 above the horizontal dotted line 61 in this plate 48 is responsible for returning the light rays repeatedly back to the surface as they propagate forwardly. The index generally of this surface layer has been indicated by $n_e$ for comparison with the more nearly constant or invariable refractive index $n_p$ for the interior of the plate. It should be kept in mind, however, that $n_e$ is merely representative of the gradient in refractive indices which, as stated above, can vary from 0.002 at the exterior surface of the plate to 0.0001 nearer the inner part thereof in comparison to the refractive index $n_p$ of the interior of the plate in general. It is here pointed out, furthermore, that this surface portion 60 may even be considered to be of considerable thickness comprehending the range of refractive indices from 0.002 to 0.0001 higher than that at the interior of the plate.

Thus, in FIG. 2, total internal reflection takes place at points 54, 56, 58, etc, since the exterior surface 52 thereof will ordinarily be in contact with air having a refractive index at $n_0$ equal to 1 and the light rays which travel beyond the forward edge, indicated by corner 14a of the element 14, will seem to be "trapped" in the upper region of the plate and will not be able to leave the plate through the exterior surface portion thereof except when aided by suitable means such as an optical prism of higher refractive index than that of the surface 52. Because all of the light rays from prism 14 will exhibit such skip behavior within the guide plate means, and there is a range of separations for the various light rays being launched and transmitted therein (of course, such skip behavior being only diagrammatic and exaggerated in FIG. 2) it is possible for a receiving prism to be used therewith to collect the light flux at any desired distance spaced from the launching prism. Also, the entrance face of any receiving prism will be uniformly illuminated by this energy.

It should be appreciated that such surface-guided optical waves exhibiting discrete lower order modes of propagation when once launched along the guide surface or guide strip, are very difficult to stop. They will follow this surface even though it may bend or twist appreciably and will ride across air gaps of small or large size between different aligned portions of the guide surface without material attenuation thereof. Additionally, black paint stripes upon the exterior surface of the guide plate and even grinding or roughening surface portions thereof will not block their forward progress.

Whereas the cost in energy for launching a surface-guided optical wave propagating in discrete lower order mode characteristics can be considerable (note for example ray 38 in FIG. 1 which is internally reflected within the prism and, accordingly, lost) once the light is launched along the guide plate this light will exhibit very low attenuation. Furthermore, when such light is launched into air in the free space between guide surface portions, and this free space may constitute a very material distance, the light so launched may very well be compared with radio and micro-wave transmission and the condition known as "end-fire" radiation associated therewith.

Figure 5:
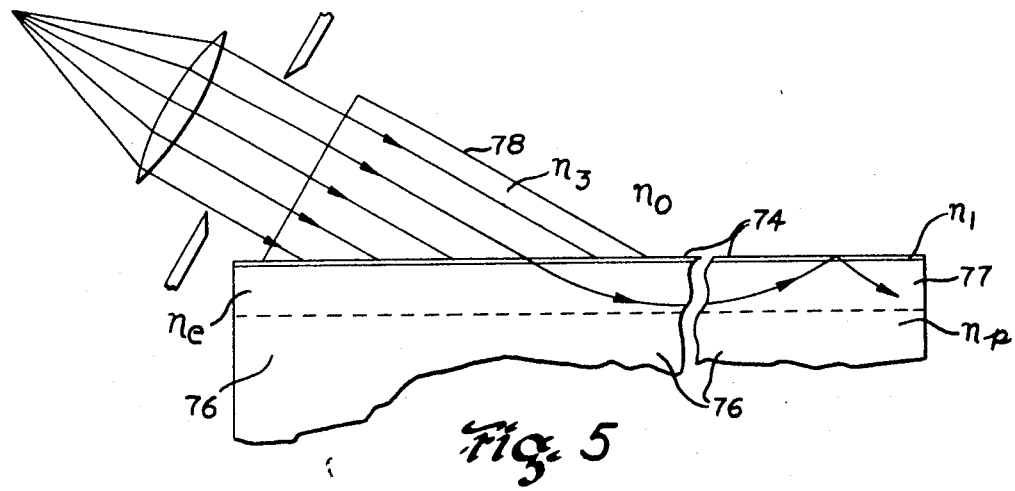
FIG. 5 is a side elevational view of a modified form of structure which may be used for the transmission of lower order mode surface-guided optical waves.

A new and improved combination may be obtained by superimposing a very thin surface layer 74 of high index material upon the exterior surface of the guide plate or strip like that shown at 52 in FIG. 2 and such an improved configuration or modification is illustrated in FIG. 5. In this figure a predetermined refractive index $n_1$ is used for this layer which is disposed upon the guide surface of the inhomogeneous strip or plate of glass or other substrate 76. Preferably the refractive index $n_1$ of the surface layer 74 exceeds the refractive index at the surface of the integral inhomogeneous portion 77 having the gradient in refractive index referred to above, and of course exceeds the refractive index $n_p$ at the interior portions of the plate or substrate 76. The index $n_1$, however, is of a lesser refractive index value than the refractive index $n_3$ of the prism 78.

Such a surface layer upon the exposed surface of the inhomogeneous surface layer exhibiting the gradient in refractive index already referred to will increase somewhat the efficiency of propagation of the surface-guided waves in lower order mode characteristics. Increasing the optical path of this layer 74 to about one wavelength serves to increase the power transmitted and might also affect the number of optical modes contributing to this transmitted power. Depending upon the intended application of the structure of the present invention, while increased power might be desirable, nevertheless, care would be exercised to assure that the number of optical modes contributing to this increased power was not too great and thus such as to interfere with the particular use being made of this transmitted power as will be more fully described hereinafter.

As stated above, it is possible to provide a gap, either large or small, between different portions of the guide plate providing the propagation path, and since the optical energy travelling along this surface is hugging closely the surface, it would be possible, as shown in FIG. 2 at the air gap 99, to provide an opaque member such as indicated at 100 somewhat below the guide-surface portion of the plate to prevent the travel of unwanted optical radiation through the plate or guide strip. When surface-guided waves travelling within such a guide strip exit through a polished end wall such as that indicated at 102, this energy 101 will be radiated therefrom as a highly directional thin sheet-like beam and can be referred to as "end-fire" phenomenon since its radiation pattern is highly directional.

Referring now to FIGS. 3 and 4 of the drawing, it will be seen that a transparent dispersion prism of relatively high refractive index $n_p$ is indicated generally by the numeral 110. This prism is arranged to serve as a launching prism for optical energy in the form of surface-guided optical waves being used to transmit an optical image of two dimensions from an object plane 111 to an image plane 112 spaced materially from each other. In fact, such spacing could be of a magnitude measured in feet, yards or miles if the occasion required. This prism 110 has an entrance surface 113 and an exit surface 114 which are so disposed relative to each other as to have, adjacent the corner AA, an included prism angle which is nearly equal to the critical angle for this prism at its interface when in optical contact with a supporting guide plate 116.

Exit prism surface 114 is shown positioned upon a flat upper surface area of guide surface 115 of guide plate or guide strip 116. This exterior surface has a relatively lower refractive index than that of prism 110. Complete optical contact at the interface 117 between these two surfaces can be insured by an immersion oil, cement or the like of higher refractive index than that of the surface 115 but lower than that of the prism. However, such a layer of immersing oil should be of minimum possible thickness since otherwise its presence is liable to effect the quality of the two-dimensional optical image energy being provided to said interface; and it should be noted that the critical angle mentioned above will depend directly upon the refractive indices of this interface.

In order to have the surface 115 of plate 116 of suitable characteristics to conduct the surface-guided optical waves desired in discrete lower order modes, it is desirable to have the guide plate possess a gradient in refractive index like that referred to above, and with its highest index $n_s$ at the exterior of the guide surface 115 and decreasing in refractive index values progressively inwardly to form said gradient and until the refractive index $n_g$ of the plate interior is reached. An opaque block is indicated at 119 merely to indicate in this figure that in no manner does optical energy pass directly from the forward vertical surface of the launching prism to the facing vertical surface of the receiving prism 130. This block 119 need not always be present in such a construction but it does show that the optical energy to be transmitted is required to travel along the guide surface 115 instead.

The entrance surface 113 of the prism 110 is preceded by a collimating lens 118 aligned therewith. An object plane 111 is disposed at the first principal focus of lens 118. The collimator lens 118 would be arranged for suitable angular and sidewise adjustment so that it can be rotated into such a position as to direct the axial ray 122 from this lens into the prism 110 so as to be within the prism at an angle of incidence $\theta_1$, which is slightly below, that is, of slightly lesser angular value than the critical angle of total internal reflection at the point 0 in the interface 117. It is important to have this structure arranged so that slight vernier adjustment of the angle $\theta_1$ can be made conveniently. Also, the collimator will be positioned so that point 0 falls approximately midway between lower prism corners AA and BB.

It is preferable to use at 110 a prism which has such an angular value at the corner AA that axial ray 122 will be incident thereon substantially at right angles to the entrance face 113. Thus, the angle AA between entrance face 113 and exit face 114 will be near the critical angle for total internal reflection at point 0 and sine AA will be approximately equal to $n_g/n_p$.

As indicated at 125, a film gate is located at the object plane 111 and has an aperture 126 therein which serves to define an object area of suitable height and width for the system. The size of such an aperture, of course, will depend upon the size of the other optical components employed in the image-transmitting system, such as the size of the lenses and prisms employed for both the launching and receiving ends of the system as well as the size of the collimated beam employed for illuminating the film gate aperture. A beam of white light for illuminating the photographic film or the like at aperture 126 is indicated at 128 and preferably this light will be directed through the aperture 126 in such a manner as to fully and evenly illuminate the aperture while being focused, as indicated in FIG. 3 at the plane of collimating lens 118. Of course, the light source for supplying beam 128 can be any conventional high intensity light source as long as its image is capable of fully illuminating the collimating lens 118.

A receiving prism 130 is disposed upon the guide surface 115 of the plate 116 at a convenient distance from but in line with the launching prism 110 and, preferably, this prism 130 has a refractive index, $n_r$, a prism angle and dispersion characteristics like that of prism 110. Thus, the entrance face 131 of this receiving prism and upper surface 115 of the guide plate 116 serves to form a second optical interface 132 therebetween and a high index immersion oil or optical cement would be used between the surfaces in order to insure an optical contact therebetween. Here again, a joint of minimum thickness would be preferable in order to avoid blurring of optical images transmitted.

The exit surface of prism 130 is indicated at 136 and a telescope 138 is shown adjacent thereto and in such relation to the image plane 112 of the image-transmitting optical system as to have its second principal focus 104′ located at this image plane. The optical axis of the telescope lens is indicated at 140. The alignment of this axis 140 with respect to point $O_1$ in the face 131 of prism 130 can be understood from the following consideration. When the collimator is in proper alignment, a light ray from the midpoint 104 of aperture 126 is incident at O and the launching interface slightly below, that is, of slightly lesser angular value than the critical angle for prism 110 and is refracted into plate 116 at an angle near the grazing angle as indicated by arrow 142. If the refractive index is higher at surface 115 than in the interior portion of the plate 116, then a ray refracted along a direction 142 sufficiently near grazing incidence will be deviated by further refraction in the gradient of refractive indices just below surface 115 such that this ray will be returned to the surface 115. When this ray returns to surface 115 at points between prism corners BB and CC, total internal reflection occurs between the material above the surface 115 which is air of a refractive index $n_0$ and the near surface of the plate 116. In this manner, the near grazing ray entering the plate 116 becomes "trapped" at the surface 115 between corner points BB and CC and cannot escape until reaching the receiving prism 130 where the refractive index relationship $n_r$ is greater than $n_s$ exists. Because of the gradient in refractive index at the guide surface 115, the light rays, after entering the guide plate through interface 114, are refracted back to the surface and reflect off of the guide surface at successive points and, thus, exhibit "skip" behavior at points as the rays curve back to the guide surface 115. Thus, it can be said that these rays tenaciously hug the guide surface and seem to be "trapped" within the upper guide region of the guide plate having the desired gradient therein and this will happen even though in-between there may be contained a "free space" of either small or large dimensions considered in the direction of propagation of the optical energy. In fact, this energy within the guide plate will follow the surface of the guide plate even though it bends or twists appreciably at locations between its ends.

If prism 130 is contacted to surface 115 by an immersion oil having a refractive index greater than $n_s$, then, because the near grazing light rays trapped in the plate 116 between corners BB and CC remain in the near grazing condition, it can be refracted into prism 130 at an angle $\theta_2$ near the critical angle of the prism 130 with respect to plate 116. In this manner, a ray from point 104 in the aperture 126 can reach point $O_1$ and be refracted along arrow direction indicated making angle $\theta_2$ with the normal 142′. The preferred included angle near corner DD between prism faces 131 and 136 falls near the critical angle so that sine DD substantially equals $n_g/n_r$. Under these preferred conditions, the axis 140 of the telescope will be pointed so as to intersect surface 131 at point $O_1$ and rays from point 104 in aperture 126 will re-appear at the corresponding image point 104′ located on or near the optical axis 140 in the image plane 112, which coincides with the rear focal plane of the telescope 138.

In order to transmit the entire image at aperture 126 which extends from point 103 to point 105, the aperture must be illuminated by white light. It is noted that all rays entering plate 116 at point O, for example, will not be refracted precisely along a path near grazing direction 142 while causing optical power transmission along this direction, but actually when all points in the prism surface between AA and BB are considered, and all will contribute light rays in the direction 142, the projection of face AA, BB upon a plane perpendicular to the arrow direction 142 will resemble a very narrow illuminated slit. This narrow slit, it has been found, is contributing a considerable amount of power in the direction 142. Upon considering the light rays transmitted by telescope 138, it will be seen that printed matter located near point 105 in aperture 126 will be seen imaged at 105′ in the image plane 112, printed matter located at point 103 in aperture 126 will be re-imaged at 103′ at image plane 112 and printed material located at 104 will be re-imaged at 104′ in image plane 112. Thus, in looking, for example, at an image formed at image plane 112, one will see the entire two-dimensional image formed at the image plane 112. Of course, the size of the collimating lens 118 and the telescope 138 must be such as to accommodate the full dimensions of this light for producing the two-dimensional image. A word image seen at 112 will contain bluish letters at point 103′, yellowish letters at 104′, and reddish letters at 105′ corresponding to object points 103, 104, and 105, respectively. Thus, the height dimension along the direction 103′ to 105′ owes its existence to the wavelength or frequency spread of the incident light beam. In this respect, the image thus produced at 112 is distinctly different from those produced by the usual method of image projection from one location to another as, for example, by use of a slide projector. On the other hand, the lateral dimension of the image considered in the direction at right angles to 103′–105′ direction and thus perpendicular to the plane of the drawing is formed in accordance with the usual laws of geometric optics.

The manner in which the image along the height coordinate is formed can be understood by considering the images formed of slits as the object. Suppose that a single, exceedingly narrow slit is located in the aperture 126 and oriented with its length dimension along the lateral direction of the optical system (that is, perpendicular to the plane of the drawing of FIG. 3). Consider first the case in which the slit is illuminated by monochromatic light. Upon tilting the collimator so that the blurred monochromatic spectrum is seen near E, a sharp spectral light will be seen in the image plane 112. This spectral light is the monochromatic image of the slit. The following properties of the spectral light are important in considering the principles of image formation by means of surface-guided optical energy:

(1) The height of the spectral line along the height coordinate 103′ to 105′ is exceedingly narrow and corresponds to the resolving power of the combined clear aperture of the telescope objective being used and prism 130, i.e. the image of the spectral line has a sharpness limited by the effective aperture of the telescope.

(2) The spectral line reaches maximum intensity at a particular angle of incidence $\theta_1$ and this intensity drops off exceedingly sharply as $\theta_1$ is altered from its maximized angle of incidence.

(3) The sharpness of the spectral line is practically independent of the slit height along 103 to 105 dimension; i.e. as the object slit is opened, the sharpness of the monochromatic spectral line remains practically unchanged. In other words, with monochromatic illumination, the image of a wide or narrow slit remains substantially unchanged with a sharpness restricted only by the resolving power associated with the clear aperture of the combined telescope and receiving prism 130 being used.

The basic fact emphasized by the properties mentioned in Sections (1)–(3) is that for a given incident wavelength $\lambda$ at the aperture 126, mainly those rays that are incident sharply at the maximizing angle $\theta_1$ max ($\lambda$) of incidence are selected by the surface-guiding mechanism for transmission of the optical flux from prism 110 to prism 130. Consequently, with monochromatic radiation, only one line perpendicular to the direction 103–105 in the aperture 126 enjoys the privilege of radiating powder that succeeds in reaching the image plane 112. Additionally, a fourth property which is considered important is that whether a very narrow object slit in aperture 126 is illuminated by monochromatic light or by white light, for a given location of the slit and for a given angularity of the collimator, only one, sharp spectral-like line appears in the image plane 112.

Exceptions to the above-mentioned four points occur only in systems that permit double-imaging. Such double-imaging can result, as mentioned above, from a "wedge effect" of appreciable value in the immersion oil being used between the prism 130 and the guide surface on plate 116 or from the tendency of some guide surfaces to support the propagation of more than a few lower order modes.

Properties in Section (1)–(4) imply that, except for wave guide surfaces that can support more than one or a very few lower order modes, of a family of rays incident at the same angle $\theta_1$ in the launching prism 110 only those rays belonging to the particular wavelengths $\lambda$ or very closely adjacent thereto for which $\theta_1$ equals $\theta_1$ max ($\lambda$) succeed in exciting in plate 116 an appreciable flow of power along the surface 115 from launching prism 110 to receiving prism 130. In conclusion, surface 115 acting as a wave guide for lower order mode propagation is highly selected in its power transmittance as regards both wavelength and angle of incidence. This selective property is a very important factor in the transmission of sharp optical images from the object plane 111 to image plane 112.

It is pointed out that when the object plane is being illuminated with white light and collimating lens 118 is focused upon this object plane, bundles of parallel light rays will be incident at interface 117 each of which bundles is parallel to a different one of the light rays included within the "cone" of light rays indicated by the angle 103–106–105; and wherein 103 and 105 are upper and lower points in the aperture 126 and point 106 is at the center of lens 118. The image transmitted will be exceedingly sharp considered particularly in its vertical direction and its sharpness will be comparable to the image quality obtained by the best of conventional telescopes. Provided that the prisms 110 and 130 are identical and provided that the focal lengths of the collimator and telescope are the same so that the optical system has symmetry at its opposite ends, the magnification ratio of the image will be unity. Images produced with the aid of a surface-guided optical wave of lower order mode transmission differ conspicuously from images produced by conventional optical methods not only in the respect that height coordinate owes its existence to a wavelength spectrum but also to the respect that the magnification ratio of the height coordinate is, in general, different from that of the lateral coordinate.

Indeed, experiments show that the image height, as it appears between 103' and 105', depends upon dispersion of color as provided by the optical components involved. Thus, if the film image to be transmitted is illuminated by monochromatic light, only a transverse line image will appear at image plane 112 and this line in the structural arrangement of FIG. 3 will be perpendicular to the plane of the paper. The maximum height of the field of view which can be obtained at image plane 112 using white light illumination will depend upon the full spectrum height which can be developed at this location. On the other hand, the maximum width of the field of view which can be obtained and the image quality in the same direction will depend upon the usual laws of geometric optics and the width of the launching and receiving prisms used.

Thus, the image magnification $M_h$ considered in the vertical or height direction of the image and the image magnification $M_w$ in the transverse or width direction of the image follow different optical principles and can be altered independently of each other. The image magnification in the horizontal direction can be simply stated as $$M_w = \frac{\text{focal length of telescope}}{\text{focal length of collimator}}$$

A magnification in the vertical direction of the image, however, is not as easily algebraically stated but, instead, is a function which increases with increase in the ratio of the dispersion of the receiving prism to the dispersion of the launching prism.

As stated previously, the surface-guided optical waves of discrete lower order mode propagation will tenaciously hug the guide surface when this surface is of suitable character and will follow it even though it may turn or twist appreciably. It can be shown with mathematical prediction that these waves having appropriate wavelengths can be propagated in discrete modes when the integral guide plate has a surface layer of refractive index higher than the value $n_g$ of the interior region of the plate. As the optical path in the guide surface portion of such a guide plate increases, the number of allowable discrete modes increases and these modes, of course, differ in regard to the angle of incidence at which each mode propagates. Therefore, if the gradient in the refractive index inwardly from the exterior guide surface is too great, one can expect too many discrete modes to be propagated and undesirable "image-doubling" or blurring will occur. However, routine testing of different guide plates will distinguish which plates are of best character for lower order mode propagation and in the two-dimensional image transmission free from image-doubling. Also, it is well to avoid the use of an immersion oil if good optical contact can be obtained between the launching and receiving prisms and the guide surface portions to be contacted thereby.

It should not be imagined that the receiving prism 130, in FIG. 3, simply reverses what already has happened to the surface-guided optical waves prior to reaching point CC and that the light at plane 112 merely appears by sheer symmetry at the rear focal plane of the telescope. On the contrary, the essential features are that the image-carrying beam travelling along the guide surface 115 be subjected to a dispersing action which is such as to counteract the dispersion condition already introduced into the light waves by the launching prism.

Figure 6:
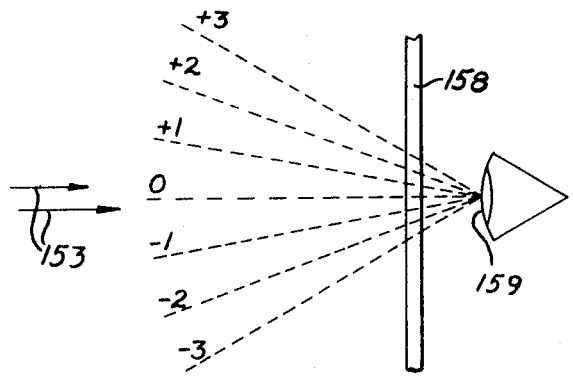
FIG. 6 is a sketch showing a diffraction grating for use in explaining principles of the present invention.

The importance of dispersion of an angle of refraction with wavelength for extracting the wave-borne image is shown by considering the arrangement in FIG. 6 wherein a diffraction grating 158 of about 5000 lines per inch was disposed (in place of the receiving guide plate and prism) in the path of end-fired radiation 153, being provided by launching prism having $n_p$ equal to 1.8 and guide plate having $n_g$ equal to 1.52. One's eye placed as illustrated at 159 will see no image of the film at the film gate aperture 126 when looking along the dotted line marked 0 or zero order diffraction, but will see images in the higher orders on each side of this zero order as indicated by dotted lines +1, +2, and +3 and −1, −2, and −3.

Also, it is interesting to note that the height of the image (formed in color) is magnified as the order number is increased. Thus, one sees a vertical series of images of increasing magnification above and below the zero line. Since red is deviated most by the grating, red appears at the outer part of each image and the images above the zero line will appear upside-down with respect to those being below the zero line.

Thus, FIG. 6 shows that it is not merely a prism or a refraction that is needed to extract the transmitted image from the end-fired beam. Instead, it is the angular dispersion with respect to wavelength that is needed and may be obtained by prism, grating or other means.

Figure 7:
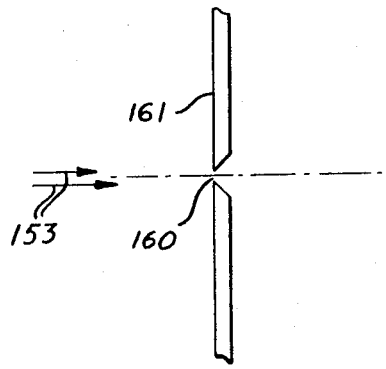
FIG. 7 is an illustration showing slit means within the optical system of the present invention for use in explaining principles of operation thereof.

When a slit, as indicated at 160 in a plate 161 in FIG. 7, was used in an end-fired beam like that at 101 in FIG. 2, it was found that this slit could be closed down to as little as 0.1 millimeter without appreciably altering the resolution of the transmitted image although the level of illumination was lowered thereby. In fact, this slit, when properly adjusted, was able to "undouble" at times some of the double images produced by the many modes being propagated by certain prism-plate combinations.

Figure 9:
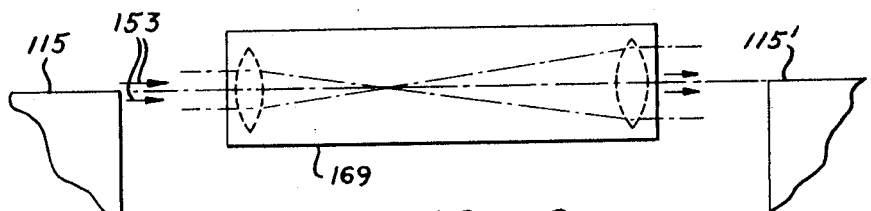
FIG. 9 is an illustration showing telescopic means within the optical system of the present invention for use in explaining principles of operation thereof.

Furthermore, when a conventional dove prism (not shown) was placed in the end-fired beam 153 between the plates in FIG. 9, the transmitted image could not be rotated in the usual fashion by rotating the dove prism. Instead, when its reflecting face was perpendicular to the plane of the projected sheet-like beam, the transmitted image was reversed from left to right. When this dove prism was at a position 90° to the position mentioned above so that its reflecting face was parallel to the plane of the projected beam 153, the orientation of the image was the same as that when the dove prism was omitted. Also, rotation from one of these positions to the other did not rotate the image but, instead, merely blurred the images at positions in-between.

In FIG. 9, a telescope 169 is diagrammatically shown in the end-fired beam 153. If the magnification of this telescope is 2 to 1, for instance, the image provided at image aperture of a system like that shown at 146 in FIGS. 3. and 4, will not be magnified in height although it will undergo a left-to-right inversion and will have a 2 to 1 magnification in the lateral direction. It should thus be appreciated that while the transmitted magnified transverse dimensions of the image are due to the inserted intermediate telescope, the height or vertical dimensions thereof are due to dispersion at near critical angle. However, if a receiving prism of different refractive and dispersive characteristics is used, a different image height will result from the particular characteristics thereof. Guide surfaces 115 and 115' are aligned.

Figure 10:
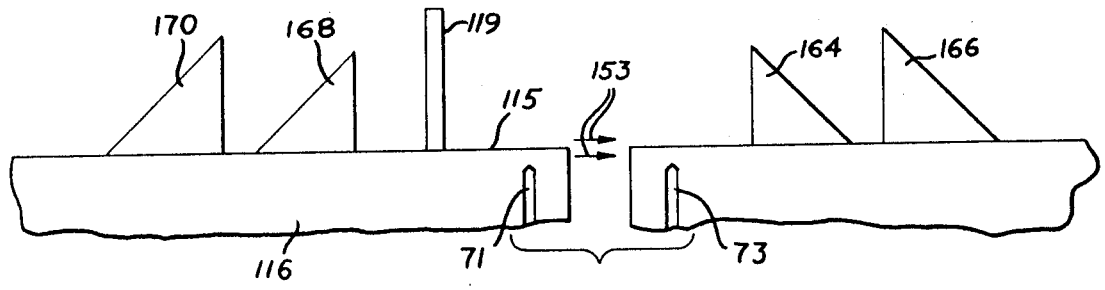
FIG. 10 is a diagrammatic showing of prisms which may be used in carrying out the present invention.

In FIG. 3, the launching and receiving prisms have been described as being single. However, it has been found that if two or more such receiving prisms such as shown at 164 and 166 in FIG. 10 are used in series upon guide plate 116, a plurality of images can be simultaneously transmitted and taken therefrom. Also, it should be possible by the use of two similar launching prisms in series, such as at 168 and 170, to launch two different pictures and superimpose same upon the same image plane. Or, if two launching prisms 169 and 170 are of different refractive indices, one transmitted image may have a different vertical dimension with respect to the other.

Having described our invention, we claim:

1. A system for transmitting two-dimensional optical images along a predetermined propagation path from an object plane to an image plane of said system, said system comprising a launching prism, a receiving prism, guide plate means forming at least parts of said propagation path, said guide plate means being formed of solid transparent material and having elongated guide surface portions adjacent said prisms and each having a flat prism-receiving area thereon, said guide surface portions being integral with said guide plate means and each having an optically finished exterior surface of known refractive index value and an appreciable gradient in refractive indices of lesser values at locations progressively inwardly thereof, said gradient in refractive indices providing a refractive index at the exterior surface which is from approximately 0.002 to 0.0001 higher in value than the refractive index value existing within the interior of said guide plate means adjacent said gradient, said launching prism and said receiving prism each having flat entrance and exit faces formed thereon and an included apex angle of predetermined value therebetween, said launching prism having its exit face and said receiving prism having its entrance face disposed in contacting relation with said flat prism-receiving areas on said guide surface portions, said launching and receiving prisms having higher predetermined refractive indices than that at the exterior surface of said guide surface portions, a film gate having an aperture of predetermined height and width disposed in said system so as to position photographic film, or the like, at said object plane, polychromic means for illuminating said film gate, a collimating lens aligned with said film gate and with the entrance face of said launching prism, and having a principal focus substantially at the plane of said film gate, said collimating lens being so positioned in said system in accordance with the difference in refractive indices at the interface between said launching prism and said guide surface portion adjacent thereto as to direct parallel light rays from said film gate aperture through said interface and into said adjacent guide plate portion very near critical angle, and so as to travel generally longitudinally within said guide plate closely adjacent said interface and the exposed exterior guide surface portion thereof as discrete lower order modes of surface-guided optical waves, and to tenaciously follow said exterior guide surface even though same may turn or twist appreciably, said receiving prism being so disposed in contact with said guide surface as to extract such surface-guided optical waves and direct same as parallel light rays substantially at critical angle outwardly through the exit face of said prism, and a receiving telescope disposed in aligned relation to the exit face of said receiving prism so as to collect said parallel light rays and direct same as to focus the light rays to said image plane and form a two-dimensional wavelength dispersed image of predetermined height and width substantially at said image plane the height direction at said film gate and the height direction at said two-dimensional image being such as to coincide with a plane containing the apex angle of the launching prism and the apex angle of the receiving prism respectively.

2. The combination defined in claim 1 and wherein an appreciable portion of said propagation path intermediate said elongated guide surface portions is occupied by a homogeneous transparent medium.

3. The combination defined in claim 1 and wherein a second apertured film gate, a collimating lens and a launching prism having a higher predetermined refractive index than said guide surface portion are positioned in said system with said second launching prism disposed in contacting aligned relation to said guide surface portion and in tandem relation to said first launching prism.

4. The combination defined in claim 3 and wherein one of said launching prisms has a higher predetermined refractive index than the refractive index of the other of said launching prisms.

5. The combination defined in claim 1 and wherein a second receiving prism of higher predetermined refractive index than that of said guide surface portion adjacent thereto and an aligned telescope are provided in said system with said second prism in contacting aligned relation to said guide surface portion so as to receive two-dimensional images transmitted by said system.

6. The combination defined in claim 5 and wherein one of said receiving prisms has a predetermined refractive index which is higher than that of the other of said receiving prisms.

7. The combination defined in claim 1 and wherein said guide plate means is formed of float-type glass and wherein the optically finished exterior guide surface thereof is that surface of the float-type glass which was disposed in contact with molten metal during the forming of said guide plate means.

8. A system for transmitting two-dimensional optical images along a predetermined propagation path from an object plane to an image-receiving location spaced therefrom, said system comprising surface-guided optical wave launching means including a launching prism and guide plate means forming at least a part of said propagation path, said guide plate means being formed of solid transparent material and having an elongated exterior guide surface portion including a flat optically finished prism-receiving area thereon, said exterior guide surface portion being integral with said guide plate means and having at its exterior surface a known refractive index value and an appreciable gradient in refractive indices of lesser values at locations progressively inwardly thereof, said gradient in refractive indices providing a refractive index at the exterior surface which is from approximately 0.002 to 0.0001 higher in value than the refractive index value existing within the interior of said guide plate means adjacent said gradient, said launching prism having flat entrance and exit faces formed thereon and an included apex angle of predetermined value therebetween, and having its exit face disposed in contacting relation with said flat prism-receiving area on said guide surface means, said launching prism having a higher predetermined refractive index than that at the exterior surface of said guide surface portion of said guide plate means, a film gate having an aperture of predetermined height and width so disposed in said system as to position photographic film, or the like, at said object plane, the height direction at said film gate being such as to coincide with a plane containing the apex angle of said launching prism, polychromic means for illuminating said film gate, a collimating lens aligned with said film gate and with the entrance face of said launching prism, and having a principal focus substantially at the plane of said film gate, said collimating lens being so positioned in said system in accordance with the difference in refractive indices at the interface between said launching prism and said exterior guide surface portion adjacent thereto as to direct parallel light rays from said film gate aperture through said interface and into said adjacent guide plate portion at very near critical angle, and so as to travel generally longitudinally within said guide plate closely adjacent said exterior guide surface portion as discrete lower order modes of surface-guided optical waves, and light-dispersing means followed by positive lens means disposed in said propagation path at said receiving location and so oriented relative thereto as to provide at the rear focal plane of said positive lens a two-dimensional wavelength dispersed image of said object.

9. The combination defined in claim 8 and wherein said light-dispersing means is in the form of a diffraction grating.

10. The combination defined in claim 8 and wherein said light-dispersing means is in the form of a dispersion prism.

References Cited

Acloque et al. "Sur L'onde de reflexion total," Comptes Rendus, vol. 250, June 1960, pp. 4328–4330.

JOHN K. CORBIN, Primary Examiner

U.S. Cl. X.R.

350—168, 286